(12) United States Patent
Park et al.

(10) Patent No.: US 12,699,551 B2
(45) Date of Patent: Aug. 4, 2026

(54) ELECTRONIC APPARATUS EQUIPPED WITH A UI DEVELOPMENT TOOL CAPABLE OF RECOMMENDING A TEMPLATE FOR A UI COMPONENT BASED ON THE CHARACTERISTICS OF THE UI TO BE DEVELOPED AND THE OPERATING METHOD THEREOF

(71) Applicant: TOBESOFT CO., LTD., Seoul (KR)

(72) Inventors: JeongBeom Park, Seoul (KR); Songi Park, Seoul (KR); Woo cheol Lee, Seoul (KR); Jea Il Kim, Namyangju-si (KR)

(73) Assignee: TOBESOFT CO., LTD., Seoul (KR)

( * ) Notice: Subject to any disclaimer, the term of this patent is extended or adjusted under 35 U.S.C. 154(b) by 625 days.

(21) Appl. No.: 18/221,885

(22) Filed: Jul. 14, 2023

(65) Prior Publication Data

US 2024/0078095 A1     Mar. 7, 2024

(30) Foreign Application Priority Data

Sep. 1, 2022   (KR) ........................ 10-2022-0110537

(51) Int. Cl.
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
CPC ..... G06F 8/38; G06F 8/34; G06F 8/36; G06F 9/451; G06F 40/186
See application file for complete search history.

(56) References Cited

U.S. PATENT DOCUMENTS

| | | | | |
|---|---|---|---|---|
| 8,789,205 | B2 * | 7/2014 | Ramaswamy | ........ G06F 21/629 |
| | | | | 715/764 |
| 8,973,087 | B2 * | 3/2015 | Ritt | ...................... H04L 63/083 |
| | | | | 726/1 |
| 9,727,623 | B1 * | 8/2017 | Catania | ............... G06F 16/2379 |
| 9,928,043 | B2 * | 3/2018 | Bacinschi | ................ G06F 8/36 |
| 10,025,777 | B2 * | 7/2018 | Hirama | .................... G06F 8/38 |

(Continued)

FOREIGN PATENT DOCUMENTS

| | | | | |
|---|---|---|---|---|
| CA | 2016225 | A1 * | 11/1990 | ............. G06F 9/454 |
| JP | 2003-186671 | A | 7/2003 | |

(Continued)

OTHER PUBLICATIONS

Lee, Chunggi, et al. "GUIComp: A GUI design assistant with real-time, multi-faceted feedback." Proceedings of the 2020 CHI conference on human factors in computing systems. 2020. (Year: 2020).*

(Continued)

*Primary Examiner* — Matthew J Brophy
(74) *Attorney, Agent, or Firm* — Park, Kim & Suh, LLC

(57)                  ABSTRACT

Disclosed is technology that recommends an appropriate design template to each component constituting the UI to a UI developer by considering the platform related to an industrial classification of a UI to be developed by the UI developer, a job of a user who is to use the UI, and a target product to which the UI is to be applied to support the UI developer to more easily develop a UI in a direction desired by the UI developer.

11 Claims, 3 Drawing Sheets

(56) References Cited

U.S. PATENT DOCUMENTS

| | | | |
|---|---|---|---|
| 10,185,556 B2 * | 1/2019 | Richstein | G06Q 10/06 |
| 10,521,502 B2 * | 12/2019 | Agarwal | G06F 3/0482 |
| 10,540,153 B2 * | 1/2020 | Stachura | G06F 8/38 |
| 10,592,077 B1 * | 3/2020 | Goldstein | G06F 3/0484 |
| 10,732,965 B2 * | 8/2020 | Barad | G06F 9/453 |
| 11,037,674 B2 * | 6/2021 | Dunwoody | G06Q 40/08 |
| 11,537,366 B1 * | 12/2022 | Jirak | G06F 8/38 |
| 11,544,452 B2 * | 1/2023 | Agarwal | G06F 40/186 |
| 11,694,162 B1 * | 7/2023 | Ackerman-Greenberg | G06Q 10/101 705/301 |
| 11,726,753 B2 * | 8/2023 | Stachura | G06F 8/30 717/109 |
| 11,893,365 B2 * | 2/2024 | Naghshin | G06F 8/38 |
| 12,096,087 B2 * | 9/2024 | Fishman | H04N 21/47202 |
| 12,131,293 B2 * | 10/2024 | Ackerman-Greenberg | G06F 8/38 |
| 12,182,505 B1 * | 12/2024 | Davies | G06F 40/186 |
| 2002/0118225 A1 * | 8/2002 | Miksovsky | G06F 8/38 715/762 |
| 2002/0186248 A1 * | 12/2002 | Ramanathan | G06F 8/38 715/780 |
| 2007/0150805 A1 * | 6/2007 | Misovski | G06F 8/38 715/234 |
| 2008/0097630 A1 * | 4/2008 | Weatherhead | G05B 19/0426 700/86 |
| 2011/0265188 A1 * | 10/2011 | Ramaswamy | G06F 21/31 715/764 |
| 2012/0137235 A1 * | 5/2012 | T S | G06F 8/38 715/763 |
| 2014/0047413 A1 * | 2/2014 | Sheive | G06F 8/33 717/110 |
| 2014/0149964 A1 * | 5/2014 | Song | G06F 8/38 717/109 |
| 2015/0347394 A1 * | 12/2015 | Hirama | G06F 8/38 715/703 |
| 2016/0357519 A1 * | 12/2016 | Vargas | G06F 40/40 |
| 2016/0357526 A1 * | 12/2016 | Soffer | G06F 8/36 |
| 2018/0046609 A1 * | 2/2018 | Agarwal | G06F 3/0482 |
| 2018/0157468 A1 * | 6/2018 | Stachura | G06F 8/34 |
| 2018/0365025 A1 * | 12/2018 | Almecija | G06F 3/0482 |
| 2019/0018661 A1 * | 1/2019 | Srinivasan Natesan | G06F 8/38 |
| 2020/0042293 A1 * | 2/2020 | Elango | G06Q 10/10 |
| 2020/0104355 A1 * | 4/2020 | Agarwal | H04N 1/00501 |
| 2021/0034225 A1 * | 2/2021 | Harazi | G06F 3/0482 |
| 2021/0073330 A1 * | 3/2021 | Inagaki | G06N 20/00 |
| 2021/0352375 A1 * | 11/2021 | Fishman | H04N 21/8545 |
| 2021/0365614 A1 * | 11/2021 | Sun | G06Q 50/04 |
| 2021/0397171 A1 * | 12/2021 | Sayyarrodsari | G05B 19/41885 |
| 2022/0107790 A1 * | 4/2022 | Naghshin | G06F 40/186 |
| 2023/0141807 A1 * | 5/2023 | Groenewegen | G06F 8/33 717/106 |
| 2023/0195427 A1 * | 6/2023 | Buesser | G06F 8/33 717/106 |
| 2024/0036835 A1 * | 2/2024 | Goyal | G06F 3/0482 |
| 2024/0103851 A1 * | 3/2024 | Pierce | G06F 8/34 |
| 2024/0311086 A1 * | 9/2024 | Duggal | G06F 8/34 |

FOREIGN PATENT DOCUMENTS

| | | | | |
|---|---|---|---|---|
| JP | 2003-280976 A | 10/2003 | | |
| JP | 2006-099566 A | 4/2006 | | |
| JP | 2012-118933 A | 6/2012 | | |
| JP | 2017-037587 A | 2/2017 | | |
| JP | 2018-028877 A | 2/2018 | | |
| JP | 2021-090114 A | 6/2021 | | |
| JP | 2022-534214 A | 7/2022 | | |
| KR | 10-2019-0038236 A | 4/2019 | | |
| KR | 10-2021-0086849 A | 7/2021 | | |
| KR | 10-2021-0103742 A | 8/2021 | | |
| KR | 10-2022-0048700 A | 4/2022 | | |
| WO | WO-2010147453 A1 * | 12/2010 | | G06F 8/38 |
| WO | WO-2020257862 A1 * | 12/2020 | | G06T 11/60 |

OTHER PUBLICATIONS

Wendler, Stefan, et al. "Development of Graphical User Interfaces based on User Interface Patterns." Proc. 4th International Conferences on Pervasive Patterns and Applications (Patterns 2012), Xpert Publishing Services. 2012. (Year: 2012).*

* cited by examiner

ELECTRONIC APPARATUS EQUIPPED WITH A UI DEVELOPMENT TOOL CAPABLE OF RECOMMENDING A TEMPLATE FOR A UI COMPONENT BASED ON THE CHARACTERISTICS OF THE UI TO BE DEVELOPED AND THE OPERATING METHOD THEREOF

CROSS-REFERENCE TO RELATED APPLICATIONS

This application claims priority to and the benefit of Korean Patent Application No. 10-2022-0110537 filed in the Korean Intellectual Property Office on Sep. 1, 2022, the entire contents of which are incorporated herein by reference.

TECHNICAL FIELD

The present invention relates to an electronic apparatus equipped with a user interface (UI) development tool capable of recommending a template for a UI component based on the characteristics of a UI to be developed and the operating method thereof.

BACKGROUND ART

In general, users who develop a user interface (UI) often generate various UI components such as a button, a text input box, a menu window, etc., in order to implement various functions when developing the UI by using a UI development tool.

In this regard, a user who intends to develop a predetermined UI needs to perform a design task for UI components constituting the UI by considering an industrial classification to which the UI is to be applied, or a platform related to a job of a user who is to use the UI or a target product to which the UI is applied.

For example, users who want to develop UIs for mobile applications related to an intellectual property system for intellectual property right officers of small and medium-sized enterprises need to perform a design task for UI components constituting the application according to an industrial classification called an intellectual property right, a job called an intellectual property right officer of the small and medium-sized enterprise, and a platform called a mobile terminal.

However, when the user who intends to develop the UI is not familiar to the design task for the UI component, the user may encounter many difficulties in conducting a design of the UI component.

Therefore, a research into technology that recommends an appropriate design template for each component constituting the UI to a UI developer by considering the platform related to an industrial classification of a UI to be developed by the UI developer, a job of a user who is to use the UI, and a target product to which the UI is to be applied to support the UI developer so as to more easily develop a UI in a direction desired by the UI developer.

SUMMARY OF THE INVENTION

The present invention has been made in an effort to provide technology that recommends an appropriate design template to each component constituting the UI to a UI developer by considering the platform related to an industrial classification of a UI to be developed by the UI developer, a job of a user who is to use the UI, and a target product to which the UI is to be applied to support the UI developer to more easily develop a UI in a direction desired by the UI developer.

An exemplary embodiment of the present invention provides an electronic apparatus equipped with a user interface (UI) development tool capable of recommending a template for a UI component based on the characteristics of a UI to be developed, which includes: a table storage unit storing a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms related to a target product which becomes a target of user interface (UI) development respectively are recorded; a template storage unit storing a template set for each of a plurality of UI components predetermined to be supported by the UI development tool, wherein the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components; a query message display unit displaying, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI on a screen among the plurality of industrial classifications, the plurality of jobs, and the plurality of platforms; a code confirmation unit confirming, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform by referring to the first table, the second table, and the third table stored in the table storage unit; and a generation unit selecting, whenever a generation command for any one UI component among the plurality of UI components is applied by the user after the confirmation of the first industrial classification code, the first job code, and the first platform code is completed, at least one design template as a recommendation template based on the first industrial classification code, the first job code, and the first platform code among the plurality of design templates included in the template set corresponding to any one UI component by referring to the template storage unit, and displaying the selected design template as a list on the screen, and then generates a UI component to which any one design template is applied when a selection command for any one design template is applied by the user.

Another exemplary embodiment of the present invention provides operating method of an electronic apparatus equipped with a user interface (UI) development tool capable of recommending a template for a UI component based on the characteristics of a UI to be developed, which includes: maintaining a table storage unit storing a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms, respectively are recorded related to a target product which becomes a target of user interface (UI) development; maintaining a template storage unit storing a template set for each of a plurality of UI components predetermined to be supported by the UI development tool, wherein the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components; displaying, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI on a screen among the plurality of industrial classifications, the plurality of jobs, and the plurality of platforms; confirming, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform by referring to the first table, the second table, and the third table stored in the table storage unit; and selecting, whenever a generation command for any one UI component among the plurality of UI components is applied by the user after the confirmation of the first industrial classification code, the first job code, and the first platform code is completed, at least one design template as a recommendation template based on the first industrial classification code, the first job code, and the first platform code among the plurality of design templates included in the template set corresponding to any one UI component by referring to the template storage unit, and displaying the selected design template as a list on the screen, and then generates a UI component to which any one design template is applied when a selection command for any one design template is applied by the user.

According to an exemplary embodiment of the present invention, it is possible to provide technology that recommends an appropriate design template to each component constituting the UI to a UI developer by considering the platform related to an industrial classification of a UI to be developed by the UI developer, a job of a user who is to use the UI, and a target product to which the UI is to be applied to support the UI developer to more easily develop a UI in a direction desired by the UI developer.

DETAILED DESCRIPTION

Figure 1:
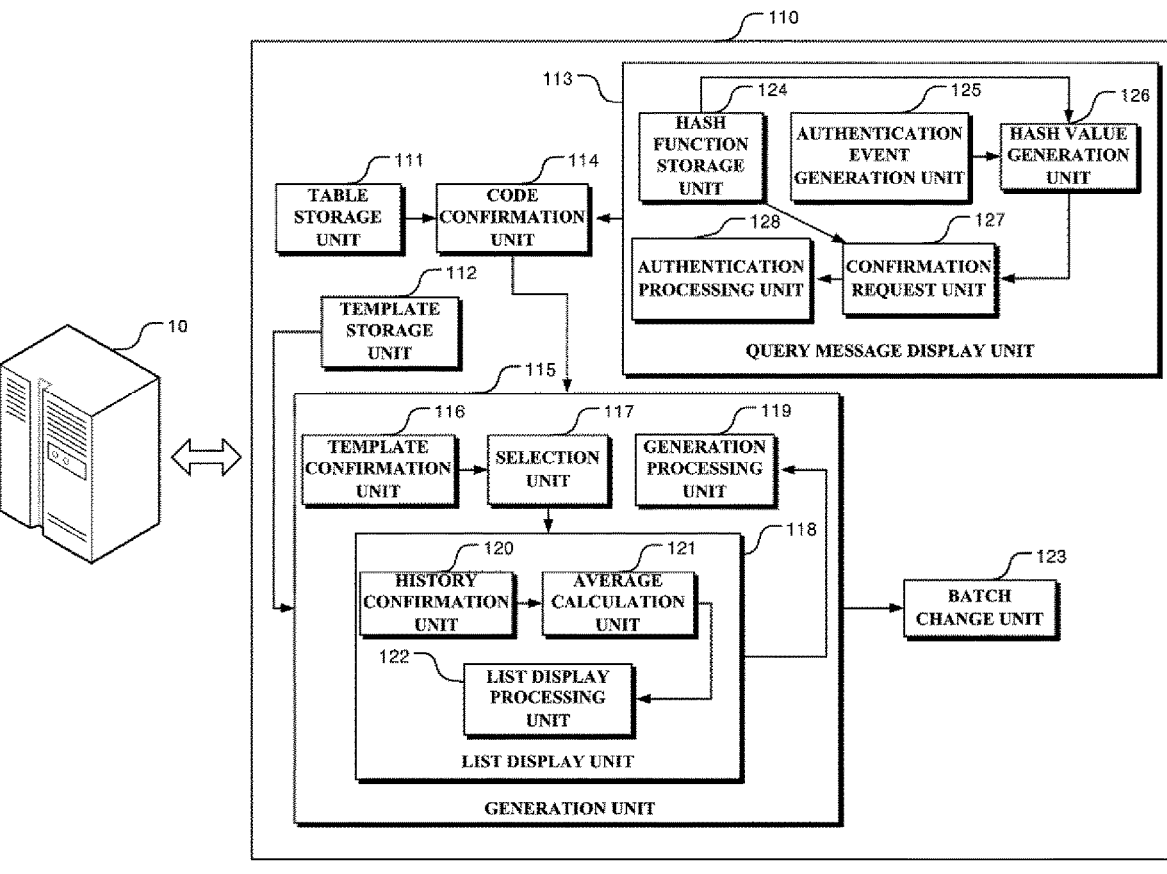
FIG. 1 is a diagram illustrating a structure of an electronic apparatus equipped with a user interface (UI) development tool capable of recommending a template for a UI component based on the characteristics of a UI to be developed according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of an electronic apparatus equipped with a user interface (UI) development tool capable of recommending a template for a UI component based on the characteristics of a UI to be developed according to an exemplary embodiment of the present invention.

Referring to FIG. 1, the electronic apparatus 110 according to the present invention includes a table storage unit 111, a template storage unit 112, a query message display unit 113, a code confirmation unit 114, and a generation unit 115.

The table storage unit 111 stores a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms, respectively are recorded related to a target product which becomes a target of user interface (UI) development.

For example, the table storage unit 111 may store a first table shown in Table 1 below, a second table shown in Table 2 below, and a third table shown in Table 3 below.

TABLE 1

| Plurality of industrial classifications | Industrial classification codes |
| --- | --- |
| Legal field | Industrial classification code 1 |
| Intellectual property right field | Industrial classification code 2 |
| Artificial intelligence field | Industrial classification code 3 |
| Smart factory field | Industrial classification code 4 |
| . . . | . . . |

TABLE 2

| Plurality of jobs | Job codes |
| --- | --- |
| Public official | Job code 1 |
| Education profession | Job code 2 |
| Law/administrative profession | Job code 3 |
| Financial/accounting profession | Job code 4 |
| . . . | . . . |

TABLE 3

| Plurality of platforms | Platform codes |
| --- | --- |
| Desktop computer | Platform code 1 |
| Mobile terminal | Platform code 2 |
| Tablet PC | Platform code 3 |
| Console video game machine | Platform code 4 |
| . . . | . . . |

The template storage unit 112 stores a template set for each of a plurality of UI components predetermined to be supported by the UI development tool.

Here, the plurality of UI components mean components which a user may create through the UI development tool, such as a button, a text input box, a menu window, etc.

In addition, the template set for each of the plurality of UI components means a set constituted by a plurality of design templates pre-made for expressing each UI component.

For example, when there is the UI component called 'button', the template set for 'button' may mean a set constituted by a plurality of design templates pre-made for expressing the UI component called 'button' on the UI. For example, the template set for 'button' may be constituted by design templates such as 'round-shaped template', 'square-shaped template', 'rhombus-shaped template, etc.

In this case, the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components.

For example, when the design template called 'round-shaped template' exists in the template set for the UI component called 'button', 'industrial classification code 1' corresponding to 'legal field' pre-specified to match 'round-shaped template' among the plurality of industrial classifications shown in Table 1 above may be allocated, 'job code 3' corresponding to 'law/administrative profession' pre-specified to match 'round-shaped template' among the plurality of jobs shown in Table 2 above may be allocated, and 'platform code 2' corresponding to 'mobile terminal' pre-specified to match 'round-shaped template' among the plurality of platforms shown in Table 3 above may be allocated, to the 'round-shaped template'.

As such, in a situation in which the table storage unit 111 stores the first, second, and third tables, and the template storage unit 112 stores the template set for each of the plurality of UI components, after the UI development tool is executed in the electronic apparatus 110, when a development start command of the new UI is applied by a user who intends to develop the new UI, the query message display unit 113 displays a query message for querying selecting an industrial classification matching the new UI, a job of a target user matching the new UI, and a platform of a target product matching the new UI on a screen among the plurality of industrial classifications, the plurality of jobs, and the plurality of platforms.

As such, when the query message is displayed on the screen, the user may apply, to the electronic apparatus 110, a selection command for an industrial classification to which a new UI to be developed by the user is to be applied, a job of a user who is expected to use the new UI, and a platform related to a target product to which the new UI is to be applied.

In this regard, when a selection command for a first industrial classification matching the new UI, a first job matching the new UI, and a first platform matching the new UI is received on the electronic apparatus 110 from the user in response to the query message, the code confirmation unit 114 confirms a first industrial classification code corresponding to the first industrial classification, a first job code corresponding to the first job, and a first platform code corresponding to the first platform by referring to the first table, the second table, and the third table stored in the table storage unit 111.

Whenever a generation command for any one UI component among the plurality of UI components is applied by the user after the confirmation of the first industrial classification code, the first job code, and the first platform code is completed, the generation unit 115 selects at least one design template as a recommendation template based on the first industrial classification code, the first job code, and the first platform code among the plurality of design templates included in the template set corresponding to any one UI component by referring to the template storage unit 112, and displays the selected design template as a list on the screen, and then generates a UI component to which any one design template is applied when a selection command for any one design template is applied by the user.

In this case, according to an exemplary embodiment of the present invention, the generation unit 115 may include a template confirmation unit 116, a selection unit 117, a list display unit 118, and a generation processing unit 119.

The template confirmation unit 116 confirms a plurality of first design templates included in a first template set corresponding to a first UI component by referring to the template storage unit 112 when a generation command for the first UI component among the plurality of UI components is applied by the user.

The selection unit 117 selects at least one second design template to which all of the first industrial classification code, the first job code, and the first platform code among the plurality of first design templates are allocated as the recommendation template.

For example, when the first UI component is a UI component corresponding to 'button', the first industrial classification code is 'industrial classification code 1' in Table 1 above, the first job code is 'job code 3' in Table 2 above, and the first platform code is 'platform code 2' in Table 3 above, the selection unit 117 may select, as the recommendation template, at least one second design template to which 'industrial classification code 1', 'job code 3', and 'platform code 2' are allocated among the plurality of first design templates included in the first template set for the first UI component called 'button' stored in the template storage unit 112.

The list display unit 118 generates a preview image for at least one second design template, and then configures a selection interface including the preview image for at least one second design template as the list, and displays the selection interface on the screen.

In this case, according to an exemplary embodiment, a predetermined embedding vector corresponding to each design template may be additionally allocated to the plurality of design templates included in the template set for each of the plurality of UI components.

Here, the embedding vector as a vector predetermined 중복 based on a design similarity between design templates may be set to be calculated as a value having a large vector similarity between embedding vectors corresponding to design templates as designs of the design templates are similar to each other. For example, when it is assumed that design template 1, design template 2, and design template 3 exist, a vector similarity between embedding vectors of design template 1 and design template 2 may be predetermined to be calculated as a large value if the design similarity between design template 1 and design template 2 is high, and a vector similarity between embedding vectors of design template 1 and design template 3 may be predetermined to be calculated as a low value if the design similarity between design template 1 and design template 3 is low. The embedding vector for the design template as a vector predetermined by a developer according to the design similarity between the respective design templates may be predetermined based on a machine learning model such as a continuous bag-of-words (CBOW) algorithm.

In this case, according to an exemplary embodiment of the present invention, the list display unit 118 may include a history confirmation unit 120, an average calculation unit 121, and a display processing unit 121.

The history confirmation unit 120 confirms, when at least one second design template is selected as the recommendation template through the selection unit 117, whether there is a history in which the UI component for the new UI is generated from a time point when the development start command of the new UI is applied to a time point before the generation command of the first UI component is applied, and when it is confirmed that there is the history in which at least one second UI component is generated as the UI component for the new UI, confirms the design template applied to each of at least one second UI component.

The average calculation unit 121 calculates an average for the vector similarity to the design template applied to each of at least one second UI component with respect to each of at least one second design template based on the embedding vector of the design template applied to each of at least one second UI component and the embedding vector of at least one second design template.

The list display processing unit 122 generates the preview image for at least one second design template, and then configures the selection interface having a list in a form in which the preview image for at least one second design template is arranged in a predetermined direction in the order of largest average first calculated for each of at least one second design template, and displays the selection interface on the screen.

Hereinafter, operations of the history confirmation unit 120, the average calculation unit 121, and the list display processing unit 122 will be described in detail, for example.

First, when it is assumed that the generation command of the UI component 'button' which is the first UI component is applied by the user, the history confirmation unit 120 may confirm whether there is the history in which the UI component for the new UI is already generated from the time point when the development start command of the new UI is applied by the user to the time point before the generation command of the UI component 'button' which is the first UI component is applied.

As a result, when it is confirmed that there is a history in which at least one second UI component such as 'text input box' and 'menu window' as the UI component for the new UI is already generated, the history confirmation unit 120 may conform the design template applied to each of 'text input box' and 'menu window' which is at least one second UI component.

In this regard, it is assumed that it is confirmed that 'design template A' and 'design template B' are applied as the design templates applied to 'text input box' and 'menu window' which are at least one second UI component, respectively.

Then, the average calculation unit 121 may calculate an average for the vector similarities to 'design template A' and 'design template B' with respect to each of at least one second design template based on the embedding vectors of 'design template A' and 'design template B' which is the design templates applied to at least one second UI component, respectively and the embedding vector of at least one second design template.

In this regard, when it is assumed that at least one second design template recommended for the first UI component is 'design template 1', 'design template 2', and 'design template 3', the average calculation unit 121 may calculate an average for the vector similarities to 'design template A' and 'design template B' with respect to each of 'design template 1', 'design template 2', and 'design template 3' based on the embedding vector of each of 'design template A' and 'design template B' and the embedding vector of each of 'design template 1', 'design template 2', and 'design template 3'.

Specifically, the average calculation unit 121 may calculate the average for 'design template 1' by dividing a sum of the vector similarity to 'design template A' and the vector similarity to 'design template B' by 2 with respect to 'design template 1', calculate the average for 'design template 2' by dividing the sum of the vector similarity to 'design template A' and the vector similarity to 'design template B' by 2 with respect to 'design template 2', and calculate the average for 'design template 3' by dividing the sum of the vector similarity to 'design template A' and the vector similarity to 'design template B' by 2 with respect to 'design template 3'.

Thereafter, the list display processing unit 122 may generate preview images for 'design template 1', 'design template 2', and 'design template 3', and then configure a selection interface having a list in a form in which the preview images for 'design template 1', 'design template 2', and 'design template 3' are arranged in a predetermined direction in the order of largest average first calculated for each of 'design template 1', 'design template 2', and 'design template 3', and display the selection interface on the screen.

Figure 2:
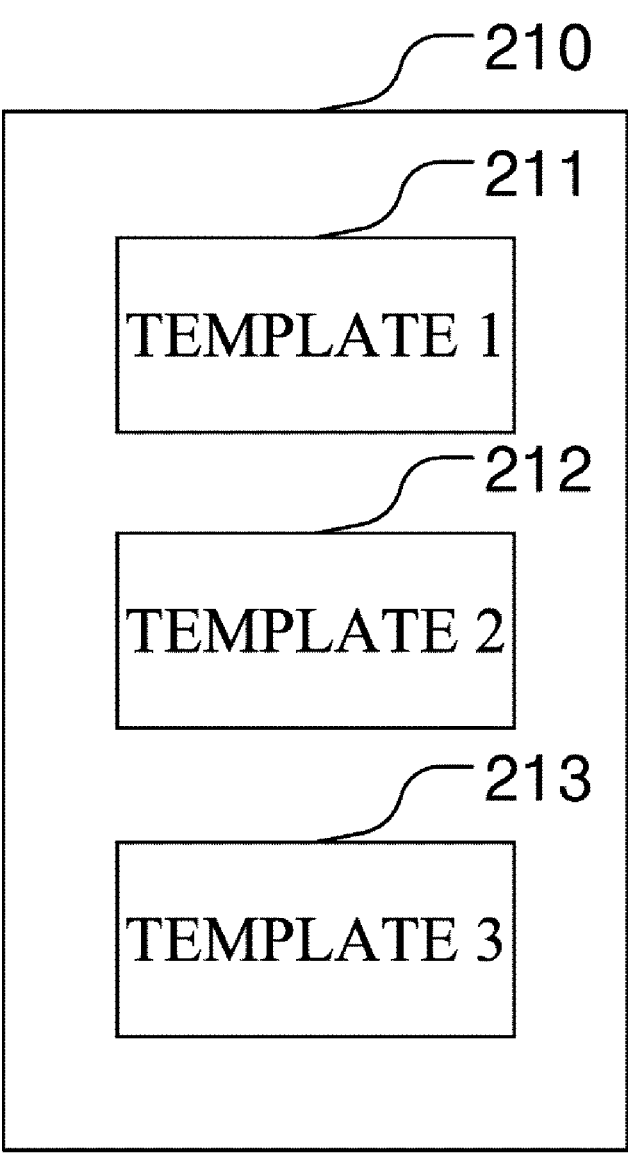
FIG. 2 is a diagram for describing an operation of an electronic apparatus equipped with a user interface (UI) development tool capable of recommending a template for a UI component based on the characteristics of a UI to be developed according to an exemplary embodiment of the present invention.

In this regard, when a larger average is calculated in the order of 'design template 1', 'design template 2', and 'design template 3', and the predetermined direction is a vertical direction, the list display processing unit 122 may configure a selection interface 210 having a list in a form in which a preview screen 211 of 'design template 1', a preview screen 212 of 'design template 2', and a preview screen 213 of 'design template 3' are sequentially listed in the vertical direction, and display the selection interface 210 on the screen, as illustrated in FIG. 2.

That is, when a generation command for a predetermined first UI component is applied by the user, the electronic apparatus 110 according to the present invention may generate a selection interface for recommending design templates for the first UI component and display the selection interface on the screen by considering an industrial classification of a new UI to be developed, a job of a target user, and a target platform, and when there is UI component of which generation is already completed in relation to the new UI, allow recommended template designs having similar designs to be preferentially listed and displayed on the selection interface by considering template designs applied to the UI components to induce the user to select a template having a design similar to a design applied to the UI components of which generation is already completed.

As such, when a selection command of the preview image for the third design template among the preview images for at least one second design template is applied through the selection interface from the user after the selection interface is displayed on the screen through the list display unit 118, the generation processing unit 119 generates the first UI component to which a design according to the third design template is applied.

In this regard, when it is assumed that the first UI component is the component corresponding to the 'button' and the selection command of the preview image for 'design template 3' is applied through the selection interface by the user, the generation processing unit 119 may generate a UI component related to 'button' to which 'design template 3' is applied.

According to an exemplary embodiment of the present invention, the electronic apparatus 110 may further include a batch change unit 123.

The batch change unit 123 confirms, when a batch automatic change request command for the design template applied to each of at least one third UI component is received from the user in a state in which generation of at least one third UI component is completed as a progress result of generation of the UI component constituting the new UI by the user, at least one design template selected as the recommendation template for each of at least one third UI component, and then randomly changes the design template applied to each of at least one third UI component to any one design template of at least one design template selected as the recommendation template for each component to complete batch automatic change processing for the design template applied to each of at least one third UI component.

For example, it is assumed that generation of three UI components, i.e., 'text input box', 'menu window', and 'button' are completed as at least one third UI component as the progress result of the generation of the UI components constituting the new UI by the user.

In this case, when the batch automatic command of the design templates for three UI components, i.e., 'text input box', 'menu window', and 'button' is received from the user, the batch change unit 123 may confirm at least one design template selected as the recommendation template with respect to each of three UI components 'text input box', 'menu window', and 'button', and then randomly change design templates currently applied to three UI components 'text input box', 'menu window', and 'button', respectively to any one design template of at least one design template selected as the recommendation template with respect to three UI components 'text input box', 'menu window', and 'button', respectively.

In this regard, it is assumed that 'design template 1 and design template 2' are recommended with respect to 'text input box' through the selection unit 117, 'design template 3 and design template 4' are recommended with respect to 'menu window' through the selection unit 117, and 'design template 5 and design template 6' are recommended with respect to 'button' through the selection unit 117. In addition, it is assumed that 'design template 1' is currently applied to 'text input box' through the generation processing unit 119, 'design template 3' is currently applied to 'menu window' through the generation processing unit 119, 'design template 6' is currently applied to 'button' through the generation processing unit 119.

In such a situation, when the batch automatic change command for the design templates applied to 'text input box', 'menu window', and 'button' is received by the user, the batch change unit 123 may randomly change 'design template 1' applied to 'text input box' to any one design template of 'design template 1 and design template 2' which are previously recommended, randomly change 'design template 3' applied to 'menu window' to any one design template of 'design template 3 and design template 4' which are previously recommended, and randomly change 'design template 6' applied to 'button' to any one design template of 'design template 5 and design template 6' which are previously recommended.

According to an exemplary embodiment of the present invention, the electronic apparatus 110 may further include a component for allowing only a pre-specified paid user to use the UI development tool according to the present invention.

In this regard, the query message display unit 113 may include a hash function storage unit 124, an authentication event generation unit 125, a hash value creation unit 126, a confirmation request unit 127, and an authentication processing unit 128.

The hash function storage unit 124 stores p (p is a natural number) different hash functions (different unique numbers constituted by natural numbers of p or less are allocated to the p hash functions, respectively) which are previously shared with a predetermined user authentication server 10.

Here, the user authentication server 10 may include a user database storing passwords of a plurality of respective paid users which are pre-specified as the paid user who may use the UI development tool and a public key corresponding to a private key previously issued for each paid user.

In this regard, the user authentication server 10 may include a user database shown in Table 4 below.

TABLE 4

| Plurality of paid users | Passwords | Public keys |
|---|---|---|
| User 1 | Password 1 | Public key 1 |
| User 2 | Password 2 | Public key 2 |
| User 3 | Password 3 | Public key 3 |
| User 4 | Password 4 | Public key 4 |
| . . . | . . . | . . . |

In such a situation, when p is '6', the hash function storage unit 124 may store '6' different hash functions as in Table 5 below.

TABLE 5

| Hash functions | Unique numbers |
|---|---|
| Hash function 1 | 1 |
| Hash function 2 | 2 |
| Hash function 3 | 3 |
| Hash function 4 | 4 |
| Hash function 5 | 5 |
| Hash function 6 | 6 |

The authentication event generation unit 125 generates an authentication event for confirming whether the user is the paid user who may use the UI development tool before displaying the query message on the screen when the development start command of the new UI is applied by the user.

The hash value creation unit 126 displays a message including contents for requesting the user of inputting the previously issued password on the screen when the authentication event is generated, and then randomly selects a first hash function which is any one of the p hash functions when a first password is input by the user, and then creates the first hash value by applying the first password to the first hash function as an input.

In this regard, when the user is assumed as 'user 2', and 'password 2' which is a password previously issued for 'user 2' is input from 'user 2', the hash value creation unit 126 randomly selects the first hash function which is any one of the hash functions shown in Table 5 above as in 'hash function 3', and then applies 'password 2' to 'hash function 3' as the input to create the first hash value.

The confirmation request unit 127 confirms a first unique number allocated to the first hash function, creates a first electronic signature value by electronically signing the first unique number with a first private key previously issued for the user, and then transmits a confirmation request command for requesting confirmation of whether the user is the paid user who may use the UI development tool while transmitting the first electronic signature value and the first hash value to the user authentication server.

In this regard, as in the example, when the user is assumed as 'user 2' and the first hash function is assumed as 'hash function 3', the confirmation request unit 127 may create the first electronic signature value by electronically signing '3' which is a unique number allocated to 'hash function 3' with 'private key 2' (here, 'private key 2' is a private key corresponding to 'public key 2' which is a public key for 'user 2') which is first private key previously issued for 'user 2'. Then, the confirmation request unit 127 may transmit the confirmation request command for requesting confirming whether 'user 2' is the paid user who may use the UI development tool while transmitting the first electronic signature value and the first hash value to the user authentication server 10.

As such, when the confirmation request command for requesting confirming whether the user is the paid user who may use the UI development tool is transmitted while transmitting the first electronic signature value and the first hash value to the user authentication server 10 from the electronic apparatus 110, the user authentication server 10 may perform a confirmation process for whether the user is the paid user who may use the UI development tool.

Specifically, the user authentication server 10 may extract the first password and the first public key for the user, which are stored in the user database, decrypt the first electronic signature value with the first public key to restore the first unique number, and then compare the hash value created by applying the first password into the first hash function to which the first unique number is allocated among the p hash functions as the input with the first hash value, and when it is confirmed that both hash values coincide with each other, confirm that the user is the paid user who may use the UI development tool.

In this regard, as in the example, it is assumed that the user is 'user 2', and the user authentication server 10 receives the first electronic signature value and the first hash value from the electronic apparatus 110.

Then, the user authentication server 10 extracts 'password 2' and 'public key 2' stored for 'user 2' from the user database shown in Table 4 above, and decrypts the first electronic signature value with 'public key 2' to restore the unique number '3'.

Thereafter, the user authentication server 10 may extract 'hash function 3' to which the unique number '3' is allocated from the hash functions shown in Table 5 above, create the hash value by applying 'password 2' into 'hash function 3' as the input, and then compare the hash value with the first hash value received from the electronic apparatus 110, and when it is confirmed that both hash values coincide with each other, confirm that 'user 2' is the paid user who may use the UI development tool, and when it is confirmed that 'user 2' is the paid user, transmit, to the electronic apparatus 110, a response indicating that it is confirmed that 'user 2' is the paid user.

As such, when the electronic apparatus 110 receives the response indicating that confirmed the user is the paid user who may use the UI development tool from the user authentication server 10, the authentication processing unit 128 may display, on the screen, the query message for querying the user to select the industrial classification, the job, and the platform matching the new UI.

Figure 3:
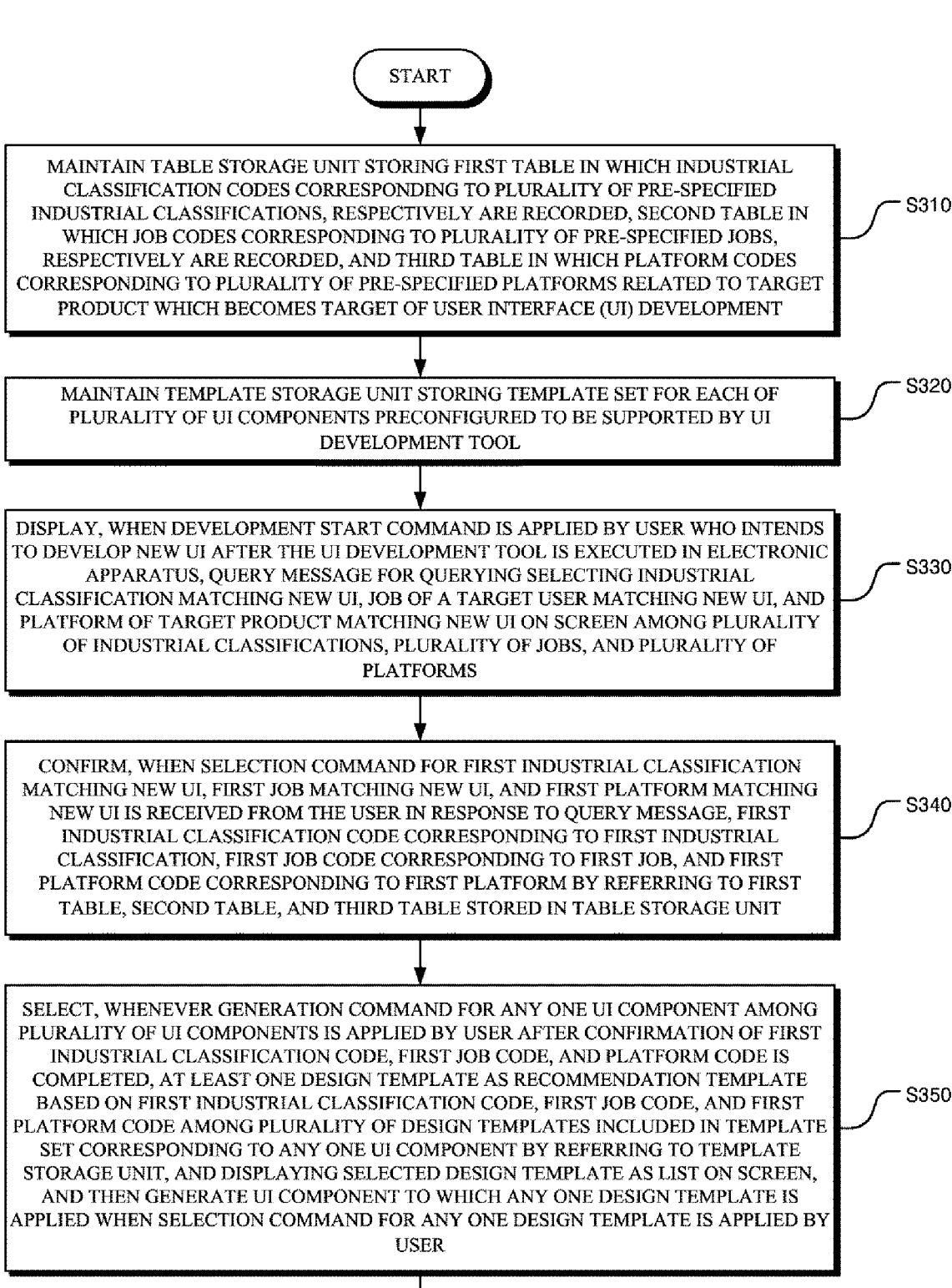
FIG. 3 is a flowchart illustrating an operating method of an electronic apparatus equipped with a user interface (UI) development tool capable of recommending a template for a UI component based on the characteristics of a UI to be developed according to an exemplary embodiment of the present invention.

FIG. 3 is a flowchart illustrating an operating method of an electronic apparatus equipped with a user interface (UI) development tool capable of recommending a template for a UI component based on the characteristics of a UI to be developed according to an exemplary embodiment of the present invention.

In step S310, a table storage unit is maintained, which stores a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms, respectively are recorded related to a target product which becomes a target of user interface (UI) development.

In step S320, a template storage unit is maintained, which stores a template set for each of a plurality of UI components predetermined to be supported by the UI development tool, in which the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively are pre-allocated to the plurality of design templates included in the template set for each of the plurality of UI components.

In step S330, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI is displayed on a screen among the plurality of industrial classifications, the plurality of jobs, and the plurality of platforms.

In step S340, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform are confirmed by referring to the first table, the second table, and the third table stored in the table storage unit.

In step S350, whenever a generation command for any one UI component among the plurality of UI components is applied by the user after the confirmation of the first industrial classification code, the first job code, and the first platform code is completed, at least one design template is selected as a recommendation template based on the first industrial classification code, the first job code, and the first platform code among the plurality of design templates included in the template set corresponding to any one UI component by referring to the template storage unit, and the selected design template is displayed as a list on the screen, and then a UI component to which any one design template is applied is generated when a selection command for any one design template is applied by the user.

In this case, according to an exemplary embodiment of the present invention, step S350 may include confirming a plurality of first design templates included in a first template set corresponding to a first UI component by referring to the template storage unit when a generation command for the first UI component among the plurality of UI components is applied by the user, selecting at least one second design template to which all of the first industrial classification code, the first job code, and the first platform code among the plurality of first design templates are allocated as the recommendation template, generating a preview image for at least one second design template, and then configuring a selection interface including the preview image for at least one second design template as the list, and displaying the selection interface on the screen, and generating, when a selection command of the preview image for the third design template among the preview images for at least one second design template is applied through the selection interface from the user, the first UI component to which a design according to the third design template is applied.

In this case, according to an exemplary embodiment of the present invention, in the operating method of an electronic apparatus, a predetermined embedding vector corresponding to each design template may be additionally allocated to the plurality of design templates included in the template set for each of the plurality of UI components, in which the embedding vector as a vector predetermined based on a design similarity between design templates is set to be calculated as a value having a large vector similarity between embedding vectors corresponding to design templates as designs of the design templates are similar to each other.

In this case, the configuring of the selection interface and displaying of the selection interface on the screen may include confirming, when at least one second design template is selected as the recommendation template, whether there is a history in which the UI component for the new UI is generated from a time point when the development start command of the new UI is applied to a time point before the generation command of the first UI component is applied, and when it is confirmed that there is the history in which at least one second UI component is generated as the UI component for the new UI, confirming the design template applied to each of at least one second UI component, calculating an average for the vector similarity to the design template applied to each of at least one second UI component with respect to each of at least one second design template based on the embedding vector of the design template applied to each of at least one second UI component and the embedding vector of at least one second design template, and generating the preview image for at least one second design template, and then configuring the selection interface having a list in a form in which the preview image for at least one second design template is arranged in a predetermined direction in the order of largest average first calculated for each of at least one second design template, and displaying the selection interface on the screen.

According to an exemplary embodiment of the present invention, the operating method of an electronic apparatus may further include: confirming, when a batch automatic change request command for the design template applied to each of at least one third UI component is received from the user in a state in which generation of at least one third UI component is completed as a progress result of generation of the UI component constituting the new UI by the user, at least one design template selected as the recommendation template for each of at least one third UI component, and then randomly changing the design template applied to each of at least one third UI component to any one design template of at least one design template selected as the recommendation template for each component to complete batch automatic change processing for the design template applied to each of at least one third UI component.

According to an exemplary embodiment of the present invention, step S330 may include maintaining a hash function storage unit storing p (p is a natural number) different hash functions, in which different unique numbers constituted by natural numbers of p or less are allocated to the p hash functions, respectively, which are previously shared with a predetermined user authentication server, in which the user authentication server includes a user database storing passwords of a plurality of respective paid users which are pre-specified as the paid user who may use the UI development tool and a public key corresponding to a private key previously issued for each paid user, generating an authentication event for confirming whether the user is the paid user who may use the UI development tool before displaying the query message on the screen when the development start command of the new UI is applied by the user, displaying a message including contents for requesting the user of inputting the previously issued password on the screen when the authentication event is generated, and then randomly selecting a first hash function which is any one of the p hash functions when a first password is input by the user, and then creating the first hash value by applying the first password to the first hash function as an input, confirming a first unique number allocated to the first hash function, creating a first electronic signature value by electronically signing the first unique number with a first private key previously issued for the user, and then transmitting a confirmation request command for requesting confirming whether the user is the paid user who uses the UI development tool while transmitting the first electronic signature value and the first hash value to the user authentication server, and as the user authentication server extracts the first password and the first public key for the user, which are stored in the user database, decrypts the first electronic signature value with the first public key to restore the first unique number, and then compares the hash value created by applying the first password into the first hash function to which the first unique number is allocated among the p hash functions as the input with the first hash value, and as it is confirmed that both hash values coincide with each other, when a response indicating that it is confirmed that the user is the paid user who may use the UI development tool is received from the user authentication server, in response to the confirmation request command, displaying the query message on the screen.

Hereinabove, the operating method of the electronic apparatus according to an exemplary embodiment of the present invention is described with reference to FIG. 3. Here, since the operating method of the electronic apparatus according to an exemplary embodiment of the present invention may correspond to the configuration of the operation of the electronic apparatus 110 described by using FIGS. 1 and 2, a more detailed description thereof will be omitted.

The operating method of the electronic apparatus according to an exemplary embodiment of the present invention may be implemented by a computer program stored in a storage medium for executing the computer program through coupling with a computer.

The operating method of the electronic apparatus according to an exemplary embodiment of the present invention may be implemented in a program command type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic apparatus equipped with a user interface (UI) development tool capable of recommending a template for a UI component based on the characteristics of a UI to be developed, comprising:

a table storage unit storing a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms, respectively are recorded related to a target product which becomes a target of user interface (UI) development;

a template storage unit storing a template set for each of a plurality of UI components predetermined to be supported by the UI development tool, wherein the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components;

a query message display unit displaying, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI on a screen among the plurality of industrial classifications, the plurality of jobs, and the plurality of platforms;

a code confirmation unit confirming, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform by referring to the first table, the second table, and the third table stored in the table storage unit; and a generation unit selecting, whenever a generation command for any one UI component among the plurality of UI components is applied by the user after the confirmation of the first industrial classification code, the first job code, and the first platform code is completed, at least one design template as a recommendation template based on the first industrial classification code, the first job code, and the first platform code among the plurality of design templates included in the template set corresponding to any one UI component by referring to the template storage unit, and displaying the selected design template as a list on the screen, and then generates a UI component to which any one design template is applied when a selection command for any one design template is applied by the user.

2. The electronic apparatus of claim 1, wherein the generation unit includes a template confirmation unit confirming a plurality of first design templates included in a first template set corresponding to a first UI component by referring to the template storage unit when a generation command for the first UI component among the plurality of UI components is applied by the user, a selection unit selecting at least one second design template to which all of the first industrial classification code, the first job code, and the first platform code among the plurality of first design templates are allocated as the recommendation template, a list display unit generating a preview image for at least one second design template, and then configuring a selection interface including the preview image for at least one second design template as the list, and displaying the selection interface on the screen, and a generation processing unit generating, when a selection command of the preview image for the third design template among the preview images for at least one second design template is applied through the selection interface from the user, the first UI component to which a design according to the third design template is applied.

3. The electronic apparatus of claim 2, wherein a predetermined embedding vector corresponding to each design template is additionally allocated to the plurality of design templates included in the template set for each of the plurality of UI components, wherein the embedding vector as a vector predetermined based on a design similarity between design templates is set to be calculated as a value having a large vector similarity between embedding vectors corresponding to design templates as designs of the design templates are similar to each other, and the list display unit includes a history confirmation unit confirming, when at least one second design template is selected as the recommendation template, whether there is a history in which the UI component for the new UI is generated from a time point when the development start command of the new UI is applied to a time point before the generation command of the first UI component is applied, and when it is confirmed that there is the history in which at least one second UI component is generated as the UI component for the new UI, confirming the design template applied to each of at least one second UI component, an average calculation unit calculating an average for the vector similarity to the design template applied to each of at least one second UI component with respect to each of at least one second design template based on the embedding vector of the design template applied to each of at least one second UI component and the embedding vector of at least one second design template, and a list display processing unit generating the preview image for at least one second design template, and then configuring the selection interface having a list in a form in which the preview image for at least one second design template is arranged in a predetermined direction in the order of largest average first calculated for each of at least one second design template, and displaying the selection interface on the screen.

4. The electronic apparatus of claim 2, further comprising:

a batch change unit confirming, when a batch automatic change request command for the design template applied to each of at least one third UI component is received from the user in a state in which generation of at least one third UI component is completed as a progress result of generation of the UI component constituting the new UI by the user, at least one design template selected as the recommendation template for each of at least one third UI component, and then randomly changing the design template applied to each of at least one third UI component to any one design template of at least one design template selected as the recommendation template for each component to complete batch automatic change processing for the design template applied to each of at least one third UI component.

5. The electronic apparatus of claim 1, wherein the query message display unit includes a hash function storage unit storing p, wherein p is a natural number, different hash functions, wherein different unique numbers constituted by natural numbers of p or less are allocated to the p hash functions, respectively, which are previously shared with a predetermined user authentication server, wherein the user authentication server includes a user database storing passwords of a plurality of respective paid users which are pre-specified as the paid user who may use the UI development tool and a public key corresponding to a private key previously issued for each paid user, an authentication event generation unit generating an authentication event for confirming whether the user is the paid user who may use the UI development tool before displaying the query message on the screen when the development start command of the new UI is applied by the user, a hash value creation unit displaying a message including contents for requesting the user of inputting the previously issued password on the screen when the authentication event is generated, and then randomly selecting a first hash function which is any one of the p hash functions when a first password is input by the user, and then creating the first hash value by applying the first password to the first hash function as an input, a confirmation request unit confirming a first unique number allocated to the first hash function, creating a first electronic signature value by electronically signing the first unique number with a first private key previously issued for the user, and then transmitting a confirmation request command for requesting confirming whether the user is the paid user who uses the UI development tool while transmitting the first electronic signature value and the first hash value to the user authentication server, and an authentication processing unit displaying the query message on the screen as the user authentication server extracts the first password and the first public key for the user, which are stored in the user database, decrypts the first electronic signature value with the first public key to restore the first unique number, and then compares the hash value created by applying the first password into the first hash function to which the first unique number is allocated among the p hash functions as the input with the first hash value, and as it is confirmed that both hash values coincide with each other, when a response indicating that it is confirmed that the user is the paid user who may use the UI development tool is received from the user authentication server, in response to the confirmation request command.

6. An operating method of an electronic apparatus equipped with a user interface (UI) development tool capable of recommending a template for a UI component based on the characteristics of a UI to be developed, comprising:

maintaining a table storage unit storing a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms respectively are recorded related to a target product which becomes a target of user interface (UI) development;

maintaining a template storage unit storing a template set for each of a plurality of UI components predetermined to be supported by the UI development tool, wherein the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components;

displaying, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI on a screen among the plurality of industrial classifications, the plurality of jobs, and the plurality of platforms;

confirming, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform by referring to the first table, the second table, and the third table stored in the table storage unit; and selecting, whenever a generation command for any one UI component among the plurality of UI components is applied by the user after the confirmation of the first industrial classification code, the first job code, and the first platform code is completed, at least one design template as a recommendation template based on the first industrial classification code, the first job code, and the first platform code among the plurality of design templates included in the template set corresponding to any one UI component by referring to the template storage unit, and displaying the selected design template as a list on the screen, and then generates a UI component to which any one design template is applied when a selection command for any one design template is applied by the user.

7. The operating method of an electronic apparatus of claim 6, wherein the generating includes confirming a plurality of first design templates included in a first template set corresponding to a first UI component by referring to the template storage unit when a generation command for the first UI component among the plurality of UI components is applied by the user, selecting at least one second design template to which all of the first industrial classification code, the first job code, and the first platform code among the plurality of first design templates are allocated as the recommendation template, generating a preview image for at least one second design template, and then configuring a selection interface including the preview image for at least one second design template as the list, and displaying the selection interface on the screen, and generating, when a selection command of the preview image for the third design template among the preview images for at least one second design template is applied through the selection interface from the user, the first UI component to which a design according to the third design template is applied.

8. The operating method of an electronic apparatus of claim 7, wherein a predetermined embedding vector corresponding to each design template is additionally allocated to the plurality of design templates included in the template set for each of the plurality of UI components, wherein the embedding vector as a vector predetermined based on a design similarity between design templates is set to be calculated as a value having a large vector similarity between embedding vectors corresponding to design templates as designs of the design templates are similar to each other, and the configuring of the selection interface and displaying of the selection interface on the screen includes confirming, when at least one second design template is selected as the recommendation template, whether there is a history in which the UI component for the new UI is generated from a time point when the development start command of the new UI is applied to a time point before the generation command of the first UI component is applied, and when it is confirmed that there is the history in which at least one second UI component is generated as the UI component for the new UI, confirming the design template applied to each of at least one second UI component, calculating an average for the vector similarity to the design template applied to each of at least one second UI component with respect to each of at least one second design template based on the embedding vector of the design template applied to each of at least one second UI component and the embedding vector of at least one second design template, and generating the preview image for at least one second design template, and then configuring the selection interface having a list in a form in which the preview image for at least one second design template is arranged in a predetermined direction in the order of largest average first calculated for each of at least one second design template, and displaying the selection interface on the screen.

9. The operating method of an electronic apparatus of claim 7, further comprising:

confirming, when a batch automatic change request command for the design template applied to each of at least one third UI component is received from the user in a state in which generation of at least one third UI component is completed as a progress result of generation of the UI component constituting the new UI by the user, at least one design template selected as the recommendation template for each of at least one third UI component, and then randomly changing the design template applied to each of at least one third UI component to any one design template of at least one design template selected as the recommendation template for each component to complete batch automatic change processing for the design template applied to each of at least one third UI component.

10. The operating method of an electronic apparatus of claim 6, wherein the displaying of the query message on the screen includes maintaining a hash function storage unit storing p, wherein p is a natural number, different hash functions, wherein different unique numbers constituted by natural numbers of p or less are allocated to the p hash functions, respectively, which are previously shared with a predetermined user authentication server, wherein the user authentication server includes a user database storing passwords of a plurality of respective paid users which are pre-specified as the paid user who may use the UI development tool and a public key corresponding to a private key previously issued for each paid user, generating an authentication event for confirming whether the user is the paid user who may use the UI development tool before displaying the query message on the screen when the development start command of the new UI is applied by the user, displaying a message including contents for requesting the user of inputting the previously issued password on the screen when the authentication event is generated, and then randomly selecting a first hash function which is any one of the p hash functions when a first password is input by the user, and then creating the first hash value by applying the first password to the first hash function as an input, confirming a first unique number allocated to the first hash function, creates a first electronic signature value by electronically signing the first unique number with a first private key previously issued for the user, and then transmitting a confirmation request command for requesting confirming whether the user is the paid user who uses the UI development tool while transmitting the first electronic signature value and the first hash value to the user authentication server, and as the user authentication server extracts the first password and the first public key for the user, which are stored in the user database, decrypts the first electronic signature value with the first public key to restore the first unique number, and then compares the hash value created by applying the first password into the first hash function to which the first unique number is allocated among the p hash functions as the input with the first hash value, and as it is confirmed that both hash values coincide with each other, when a response indicating that it is confirmed that the user is the paid user who may use the UI development tool is received from the user authentication server, in response to the confirmation request command, displaying the query message on the screen.

11. A non-transitory computer readable recording medium having a program recorded therein for allowing a computer to execute an operating method of an electronic apparatus equipped with a user interface (UI) development tool capable of recommending a template for a UI component based on the characteristics of a UI to be developed, the operating method comprising:

maintaining a table storage unit storing a first table in which industrial classification codes corresponding to a plurality of pre-specified industrial classifications, respectively are recorded, a second table in which job codes corresponding to a plurality of pre-specified jobs, respectively are recorded, and a third table in which platform codes corresponding to a plurality of pre-specified platforms respectively are recorded related to a target product which becomes a target of user interface (UI) development;

maintaining a template storage unit storing a template set for each of a plurality of UI components predetermined to be supported by the UI development tool, wherein the template set for each of the plurality of UI components means a set constituted by a plurality of design templates pre-made for expressing each UI component, and the industrial classification code for at least one industrial classification, the job code for at least one job, and the platform code for at least one platform pre-specified to match each design template from the plurality of industrial classifications, the plurality of jobs, and the plurality of platforms, respectively may be pre-allocated to the plurality of design templates included in the template set for each of the plurality of UI components;

displaying, when a development start command of the new UI is applied by a user who intends to develop the new UI after the UI development tool is executed in the electronic apparatus, a query message for querying selecting an industrial classification matching the new UI, a job of a target user matching the new UI, and a platform of a target product matching the new UI on a screen among the plurality of industrial classifications, the plurality of jobs, and the plurality of platforms;

confirming, when a selection command for a first industrial classification matching the new UI, a first job matching the new UI, and a first platform matching the new UI is received from the user in response to the query message, a first industrial classification code corresponding to the first industrial classification, a first job code corresponding to the first job, and a first platform code corresponding to the first platform by referring to the first table, the second table, and the third table stored in the table storage unit; and selecting, whenever a generation command for any one UI component among the plurality of UI components is applied by the user after the confirmation of the first industrial classification code, the first job code, and the first platform code is completed, at least one design template as a recommendation template based on the first industrial classification code, the first job code, and the first platform code among the plurality of design templates included in the template set corresponding to any one UI component by referring to the template storage unit, and displaying the selected design template as a list on the screen, and then generates a UI component to which any one design template is applied when a selection command for any one design template is applied by the user.

\* \* \* \* \*